United States Patent
Suzuki

(10) Patent No.: US 7,965,346 B2
(45) Date of Patent: Jun. 21, 2011

(54) LIQUID CRYSTAL MODULE HAVING A PAIR OF LAMP FRAMES

(75) Inventor: Yuto Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 360 days.

(21) Appl. No.: 12/140,388

(22) Filed: Jun. 17, 2008

(65) Prior Publication Data

US 2008/0316388 A1    Dec. 25, 2008

(30) Foreign Application Priority Data

Jun. 21, 2007    (JP) ................. 2007-163264

(51) Int. Cl.
  *G02F 1/1333*    (2006.01)
  *G02F 1/1335*    (2006.01)
(52) U.S. Cl. ............... 349/58; 349/61; 362/632
(58) Field of Classification Search .......... 349/58, 349/61; 362/632, 634
  See application file for complete search history.

(56) References Cited

U.S. PATENT DOCUMENTS

2005/0207149 A1    9/2005    Ono et al.
2006/0215386 A1    9/2006    Hatanaka et al.
2007/0046855 A1*   3/2007    Choi et al. .............. 349/58
2009/0154140 A1    6/2009    Aoki et al.

FOREIGN PATENT DOCUMENTS

| JP | 2002-258282 A | 9/2002 |
| JP | 2006-66363 A | 3/2006 |
| JP | 2006-330162 A | 12/2006 |
| JP | 2007-87656 A | 4/2007 |

\* cited by examiner

Primary Examiner — Nathanael R Briggs
(74) Attorney, Agent, or Firm — Global IP Counselors

(57) ABSTRACT

A liquid crystal module includes a frame, a light reflecting sheet, a cold cathode tube, an optical sheet, a liquid crystal panel, a bezel, a pair of lamp frames and a restriction component. The frame includes top, bottom, left and right side plates, and a base plate disposed on a lower side of the top, bottom, left and right side plates. The pair of lamp frames is fixedly attached along the left and right side plates of the frame in an interior of the frame. The restriction component is provided between each of the lamp frames and each of the top and bottom side plates to prevent the lamp frames from rotating around a longitudinal axis of the lamp frames with respect to the frame.

7 Claims, 9 Drawing Sheets

LIQUID CRYSTAL MODULE HAVING A PAIR OF LAMP FRAMES

CROSS-REFERENCE TO RELATED APPLICATIONS

This application claims priority to Japanese Patent Application No. 2007-163264 filed on Jun. 21, 2007. The entire disclosure of Japanese Patent Application No. 2007-163264 is hereby incorporated herein by reference.

BACKGROUND OF THE INVENTION

1. Field of the Invention

The present invention generally relates to a liquid crystal module. More specifically, the present invention relates to a liquid crystal module having a lamp frame attached to a frame.

2. Background Information

A conventional direct backlight type of liquid crystal module has a frame, a light reflecting sheet, a cold cathode tube, a pair of lamp frames, an optical sheet, a liquid crystal panel and a bezel. The light reflecting sheet is provided in an interior of the frame. The cold cathode tube is disposed above the light reflecting sheet. The lamp frames are provided on an inside of opposing side plates of the frame. The optical sheet and the liquid crystal panel are disposed above the cold cathode tube. The bezel is installed from above to hold down a peripheral edge of the liquid crystal panel. With the liquid crystal module, the lamp frames are usually attached and fixed to the frame with a number of screws or other such fasteners.

However, when a number of screws are used to fix the lamp frames on the inside of the opposing side plates of the frame, threading the screws takes more time and work, and the cost of the screws is also entailed. As a result, assembly work becomes less efficient and the manufacturing cost becomes higher. Thus, there exists a need for an improved liquid crystal module with which the lamp frames are securely fixed without the screws.

A conventional lighting device for a backlight type of display device includes a lamp frame (see Japanese Laid-Open Patent Application Publication No. 2006-66363, for example). Another conventional liquid crystal display device includes a housing case and a backlight (see Japanese Laid-Open Patent Application Publication No. 2002-258282, for example). With the conventional liquid crystal display device, a protrusion formed on the backlight is fitted into a fixing hole formed in the housing case, and the backlight is inserted into and fixed to the housing case. With another liquid crystal display device, a U-shaped lamp is supported as a backlight in a frame to which a liquid crystal module is attached (see Japanese Laid-Open Patent Application Publication No. 2006-330162, for example). With further another liquid crystal display device, a light source and a rear cover that covers the light source are attached by a latching prong and a rib that serves to limit the position in a direction perpendicular to a latching direction of the latching prong (see Japanese Laid-Open Patent Application Publication No. 2007-87656, for example).

However, the conventional lighting device for the display device of Japanese Laid-Open Patent Application Publication No. 2006-66363 and the conventional liquid crystal display devices of Japanese Laid-Open Patent Application Publication Nos. 2002-258282, 2006-330162 and 2007-87656 are not designed so as to prevent the lamp frame from rattling or falling over.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a liquid crystal module with which a lamp frame is securely fixed to a frame.

In accordance with one aspect of the present invention, a liquid crystal module includes a frame, a light reflecting sheet, a cold cathode tube, an optical sheet, a liquid crystal panel, a bezel, a pair of lamp frames and a restriction component. The frame includes top, bottom, left and right side plates, and a base plate disposed on a lower side of the top, bottom, left and right side plates. The light reflecting sheet is provided on the bottom plate of the frame. The cold cathode tube is disposed above the light reflecting sheet. The optical sheet is disposed above the cold cathode tube. The liquid crystal panel is disposed above the optical sheet. The bezel is disposed on a peripheral edge of the liquid crystal panel to hold down the liquid crystal panel. The pair of lamp frames is fixedly attached along the left and right side plates of the frame in an interior of the frame. The restriction component is provided between each of the lamp frames and each of the top and bottom side plates to prevent the lamp frames from rotating around a longitudinal axis of the lamp frames with respect to the frame.

With the liquid crystal module of the present invention, it is possible to provide a liquid crystal module with which a lamp frame is securely fixed to a frame.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following descriptions of the preferred embodiment of the present invention is provided for illustration only and not for the purpose of limiting the invention as defined by the appended claims and their equivalents.

Figure 1:
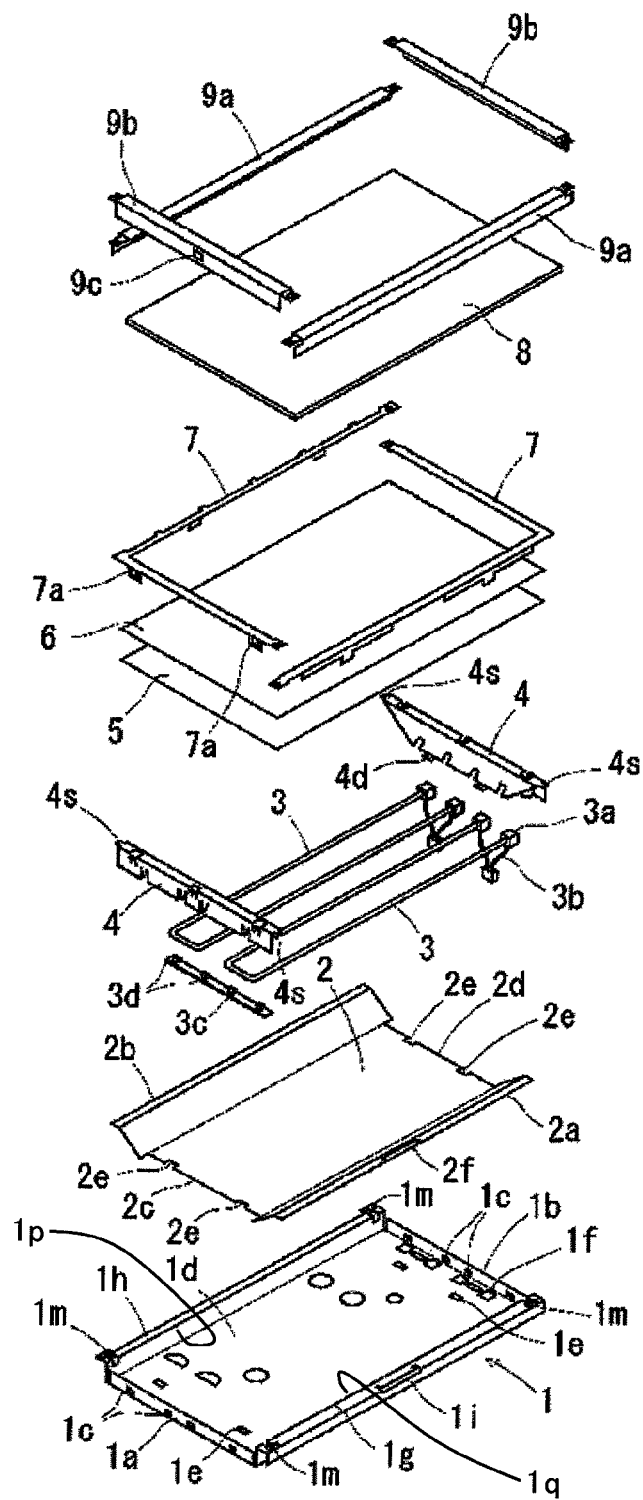
FIG. 1 is an exploded perspective view of a liquid crystal module in accordance with one embodiment of the present invention.
Figure 2:
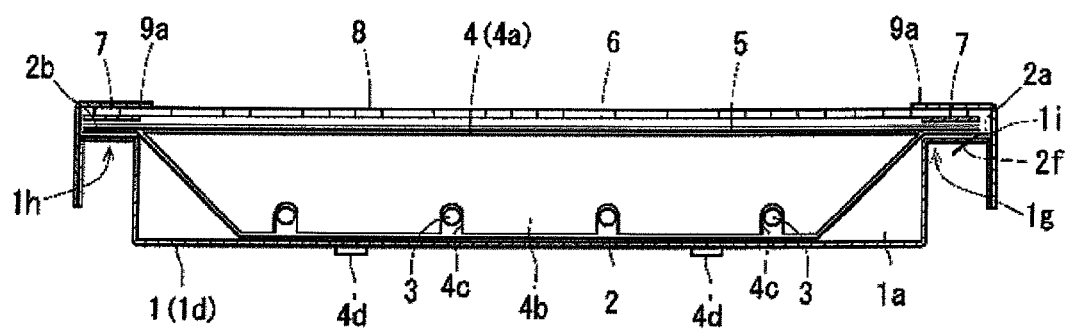
FIG. 2 is a cross sectional view of the liquid crystal module illustrated in FIG. 1.

As shown in FIGS. 1 and 2, a liquid crystal module has a frame 1, a light reflecting sheet 2, a plurality of cold cathode tubes 3, a pair of left and right lamp frames 4, a light diffusing sheet 5, a prism sheet 6, two L-shaped sheet retainer frames 7, a liquid crystal panel (liquid crystal cell) 8 and a bezel 9. The liquid crystal module is used for a personal computer or another such electronic devices. The frame 1 has left and right side plates 1a and 1b formed on opposing short sides of the frame 1. The left and right side plates 1a and 1b define an interior of the frame 1 therebetween. The light reflecting sheet 2 is provided to the interior of the frame 1. The cold cathode tubes 3 are disposed above the light reflecting sheet 2. The left and right lamp frames 4 are attached on an inside of the left and right side plates 1a and 1b. The light diffusing sheet 5 and the prism sheet 6 are disposed one over the other as optical sheets. Peripheral edges of the light diffusing sheet 5 and the prism sheet 6 are held down by the sheet retainer frames 7. The liquid crystal panel 8 is placed over the sheet retainer frames 7. The bezel 9 fixes peripheral edges of the liquid crystal panel 8 from above. The bezel 9 includes four bezel parts (two long bezels 9a and two short bezels 9b). The bezel 9 is made of metal.

Figure 10:
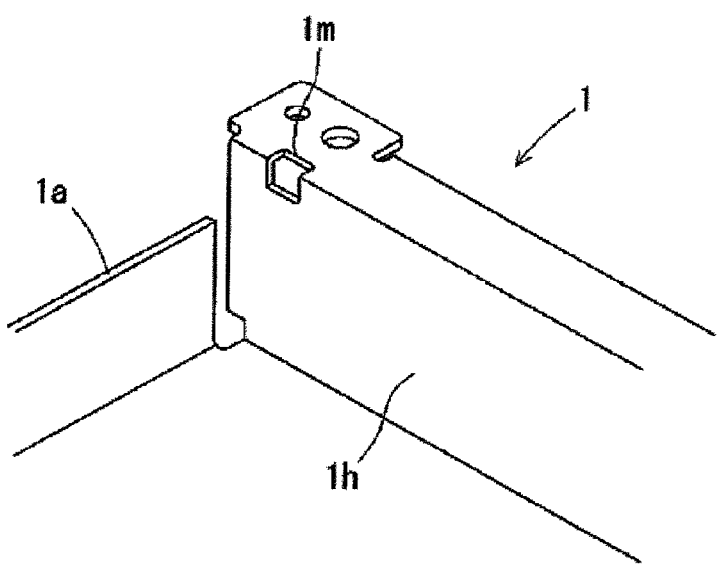
FIG. 10 is a partial perspective view of the frame.

As shown in FIG. 1, the frame 1 is made from sheet metal and is in a form of a flat, rectangular box. As shown in FIGS. 1 and 10, the frame 1 includes the left and right side plates 1a and 1b, top and bottom side plates 1p and 1q, a base plate 1d, four rectangular engagement openings (engagement components) 1c, two rectangular engagement holes 1e, a plurality of attachment holes 1f and a slit-like opening 1i. The engagement openings 1c are formed in each of the left and right side plates 1a and 1b provided to the opposing short sides. In the engagement openings 1c, latching prong pieces 4h (discussed below) of the lamp frames 4 are latched. The engagement holes 1e are made at locations near each of left and right ends of the base plate 1d. In the engagement holes 1e, latching leg pieces 4d (discussed below) of the lamp frames 4 are latched. The attachment holes 1f attach a plurality of sockets 3a of the cold cathode tubes 3. The attachment holes 1f are formed in the same number as the sockets 3a (four) at the right end part of the base plate 1d.

Figure 3:
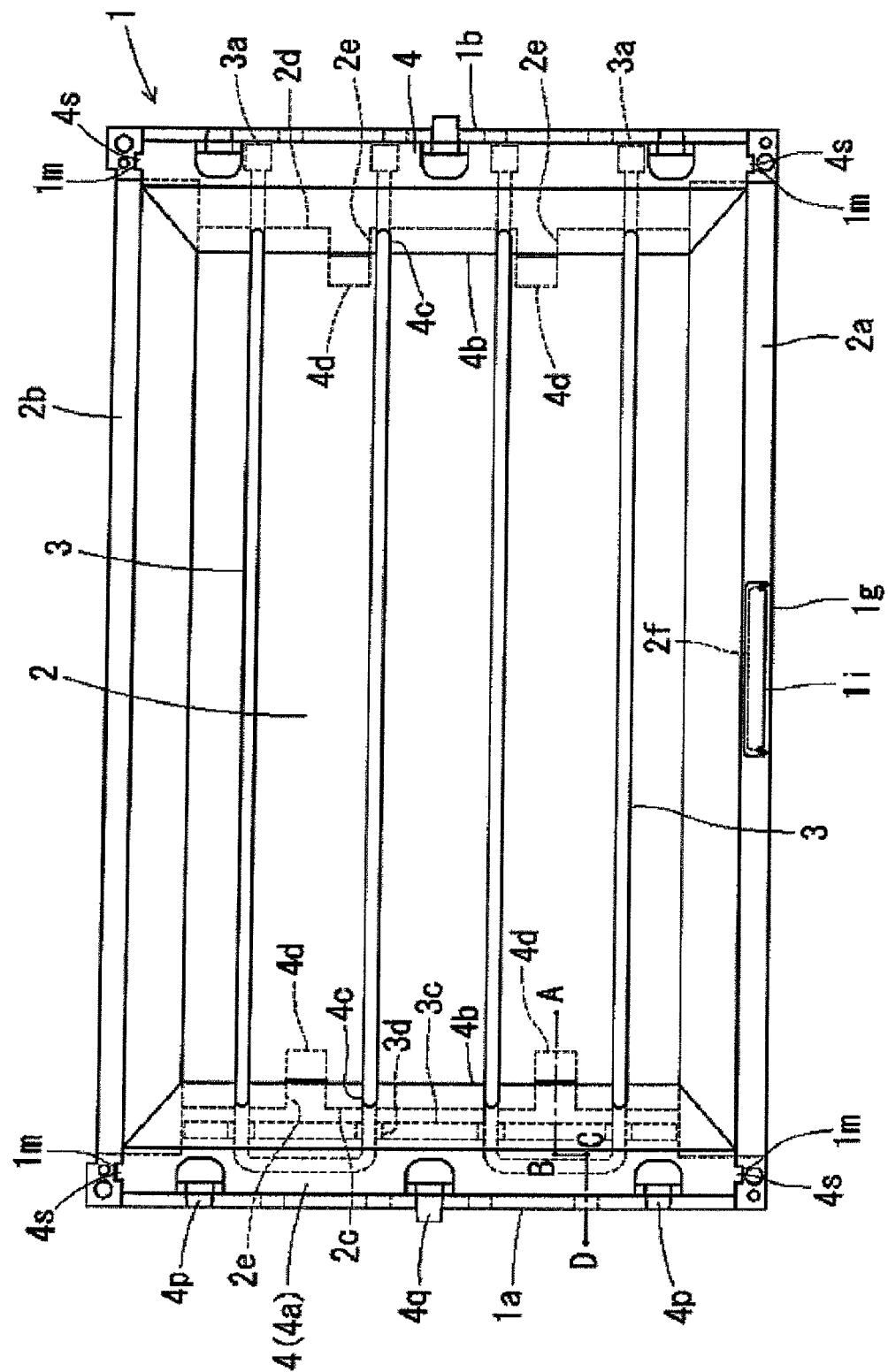
FIG. 3 is a front elevational view of a main part of the liquid crystal module illustrated in FIG. 1.

The top and bottom side plates 1p and 1q are provided as the other side plates besides the left and right side plates 1a and 1b of the frame 1. Specifically, each of the top and bottom side plates 1p and 1q is an adjacent side plate of each of the left and right side plates 1a and 1b. The top and bottom side plates 1p and 1q are provided on opposing long sides of the frame 1. The top and bottom side plates 1p and 1q include edge frame parts 1h and 1g, respectively. Specifically, each of the edge frame parts 1h and 1g forms an upper part, a corner part and a front plate part of each of the top and bottom side plates 1p and 1q. The front plate part extends outward from the upper part via the corner part located between the upper part and the front plate part. Each of the edge frame parts 1h and 1g is formed by bending an upper end of each of the top and bottom side plates 1p and 1q into an inverted U shape. As shown in FIGS. 1, 3, and 10, each of the edge frame parts 1h and 1g includes two concave components 1m as a part of lamp frame anti-falling means (fixing means) (e.g., restricting component) formed at both lateral end portions of each of the edge frame parts 1h and 1g. The lamp frame anti-falling means prevent each of the lamp frames 4 from falling over or rattling. More specifically, the lamp frame anti-falling means prevent the lamp frames 4 from rotating around a longitudinal axis of each of the lamp frames 4 with respect to the frame 1. Each of the concave components 1m is mated with convex components 4s that serve as a part of the anti-falling means (fixing means) (discussed below) for lamp frames 4. Each of the concave components 1m extends between the upper part and the front plate part of each of the top and bottom side plates 1p and 1q across the corner part. Specifically, each of the concave components 1m is formed by cutting out a part of the upper part and the front plate part across the corner part of the top and bottom side plates 1p and 1q. The slit-like opening 1i is formed in the front plate part of the edge frame part 1g. Into the slit-like opening 1i, a tab piece 2f (discussed below) of the light reflecting sheet 2 is inserted.

The light reflecting sheet 2 includes a UV blocking layer. The UV blocking layer prevents degradation by UV rays. The UV blocking layer is formed on a surface (upper face) of a light-reflecting synthetic resin sheet having a white pigment. With the UV blocking layer facing up, the light reflecting sheet 2 is bent into an inverted trapezoidal shape as shown in FIGS. 1 and 2. The light reflecting sheet 2 has a pair of end edge parts 2a and 2b, a tab piece 2f, two recesses 2e formed at each of left and right end edge portions 2c and 2d. The end edge parts 2a and 2b are formed on opposing long sides of the light reflecting sheet 2, and are placed on the edge frame parts 1h and 1g of the frame 1 so that the light reflecting sheet 2 is installed in the frame 1.

As shown in FIGS. 1 and 3, the tab piece 2f is formed by making a flat U-shaped cut in the end edge part 2a. As shown in FIGS. 2 and 3, the tab piece 2f is accurately positioned merely by being inserted into and engaged with a lower side of the edge frame part 1g from the slit-like opening 1i of the edge frame part 1g of the frame 1 toward an inside of the frame 1. As a result, the light reflecting sheet 2 can be quickly held in place.

As shown in FIGS. 1 and 3, the recesses 2e are formed in each of the left and right end edge portions 2c and 2d located on opposing left and right short sides of the light reflecting sheet 2. The latching leg pieces 4d (discussed below) of the lamp frames 4 are passed through the recesses 2e. The positional relationship between the recesses 2e on the left end edge portion 2c and the recesses 2e on the right end edge portion 2d is an asymmetrical relationship. As will be discussed below, spacing between the latching leg pieces 4d of the left lamp frame 4 on a left side is greater than (is different from) spacing between the latching leg pieces 4d of the right lamp frame 4 on a right side. Thus, spacing between the recesses 2e of the left end edge portion 2c is made correspondingly greater than (is different from) spacing between the recesses 2e of the right end edge portion 2d. Since the positional relationship of the recesses 2e is thus made asymmetric on the left and right, it is easy to tell that the light reflecting sheet 2 is upside-down even if the positional relationship of the recesses 2e of the left and right end edge portions 2c and 2d is switched around. As a result, the light reflecting sheet 2 is reliably prevented from being attached to the frame 1 with the UV blocking layer on the surface of the light reflecting sheet 2 accidentally turned to the back.

The cold cathode tubes 3 are disposed above the light reflecting sheet 2. Each of the cold cathode tubes 3 is bent in a U shape as shown in FIG. 1. The sockets 3a are attached to both ends of each U-shaped cold cathode tube 3. The sockets 3a are made of an insulating rubber. Cables 3b equipped with connectors are connected to the sockets 3a.

The cold cathode tubes 3 are attached as follows. The sockets 3a at the both ends are fitted and fixed in the attachment holes 1f of the frame 1. The connector-equipped cables 3b are taken outside through access openings formed between the attachment holes 1f. Then, as shown in FIGS. 1, 3, 8 and 9, bent portions on the opposite side of the cold cathode tubes 3 are supported by supports 3d of a lamp holder 3c. The lamp holder 3c is fixed to the base plate 1d of the frame 1.

Figure 4A:
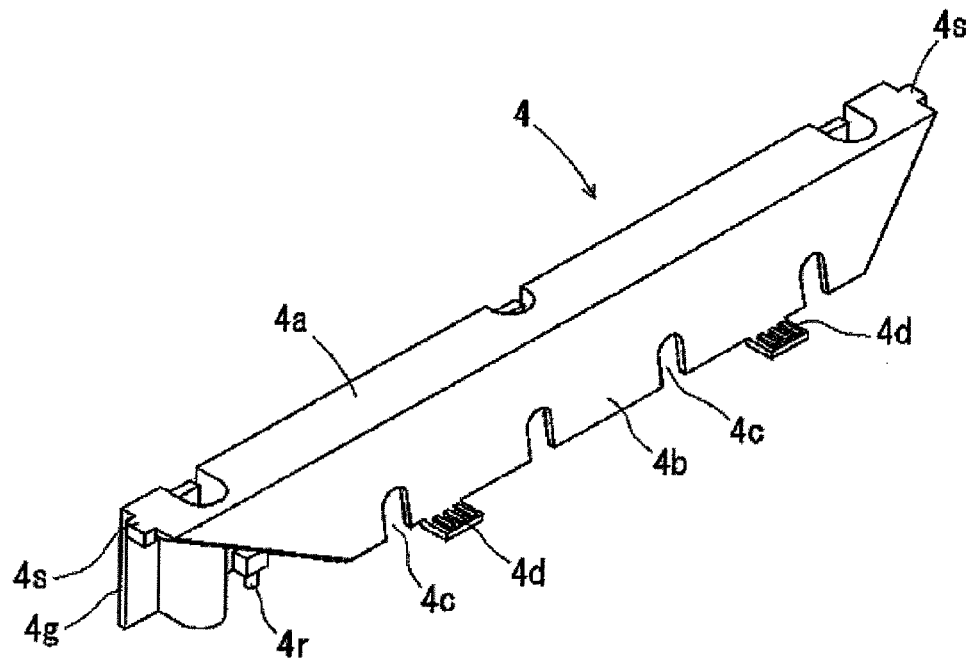
FIG. 4A is a perspective view showing an inner side of a lamp frame of the liquid crystal module illustrated in FIG. 1.

The left and right lamp frames 4 are light-reflecting molded articles made by injection molding a synthetic resin containing a white pigment. The left and right lamp frames 4 cover the lamp holder 3c and the sockets 3a of the cold cathode tubes 3. Each of the left and right lamp frames 4 includes a front plate 4a, a inner side plate 4b, a pair of latching leg pieces 4d, a plurality of latching prong pieces 4h, a vertical outer side plate 4g, a pair of side latching prong components 4p, a middle latching prong component 4q and a plurality of positioning pins 4r. The inner side plate 4b angles diagonally downward (rearward) from an inner edge portion of the front plate 4a. The outer side plate 4g extends downward from an outer edge portion of the front plate 4a. As shown in FIG. 4A, four cut-outs 4c are formed in a lower part of the inner side plate 4b. The cold cathode tubes 3 are inserted through the cut-outs 4c. The latching leg pieces 4d are formed at a lower end of the inner side plate 4b. The latching leg pieces 4d protrude inward from the lower end of the inner side plate 4b.

The positions where the latching leg pieces 4d are formed are different on the left and right lamp frames 4. As shown in FIG. 3, the spacing between the latching leg pieces 4d on the left lamp frame 4 is greater than (is different from) the spacing between the latching leg pieces 4d on the right lamp frame 4 located on the opposite side. Furthermore, spacing between the engagement holes 1e near the left end of the base plate 1d in which the latching leg pieces 4d are inserted and latched, and the spacing between the recesses 2e in the left end edge part of the light reflecting sheet 2, are greater than (are different from) spacing between the engagement holes 1e near the right end, and the spacing between the recesses 2e in the right end edge part, respectively. As shown in FIGS. 1 and 3, the positional relationship of the latching leg pieces 4d of the lamp frames 4, the positional relationship of the engagement holes 1e near the left and right ends of the frame 1, and the positional relationship of the recesses 2e at the left and right end edge portions of the light reflecting sheet 2 are all in left and right asymmetry.

Figure 6:
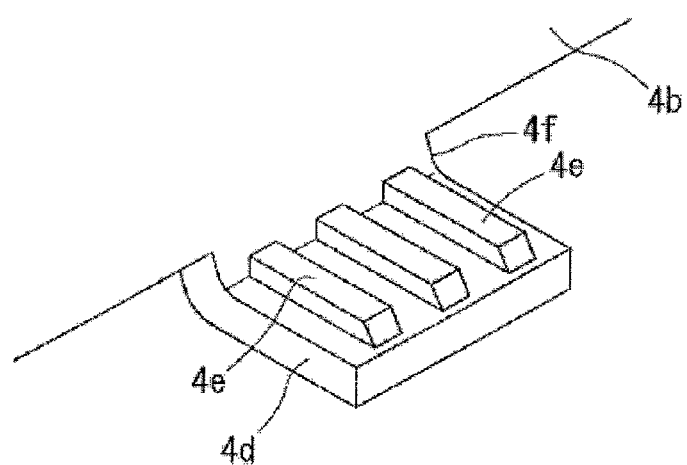
FIG. 6 is a detailed perspective view of a latching leg piece of the lamp frame illustrated in FIG. 4A.

As shown in FIG. 6, each of the latching leg pieces 4d of the lamp frame 4 has a plurality of (three) rectangular bulges (e.g., bulge sections) 4e and a curve (e.g., curve section) 4f. The bulges 4e are higher formed on an upper face of each of the latching leg pieces 4d. The curve 4f is formed at an inside corner between the latching leg piece 4d and the inner side plate 4b of the lamp frame 4. The latching leg pieces 4d are reinforced at a base portion by the curve 4f. Thus, damage or destruction of the base portion of the latching leg pieces 4d is prevented. Furthermore, upper faces of the bulges 4e are allowed to be latched to edges of the engagement holes 1e in the base plate 1d without being interrupted by the curve 4f.

Figure 4B:
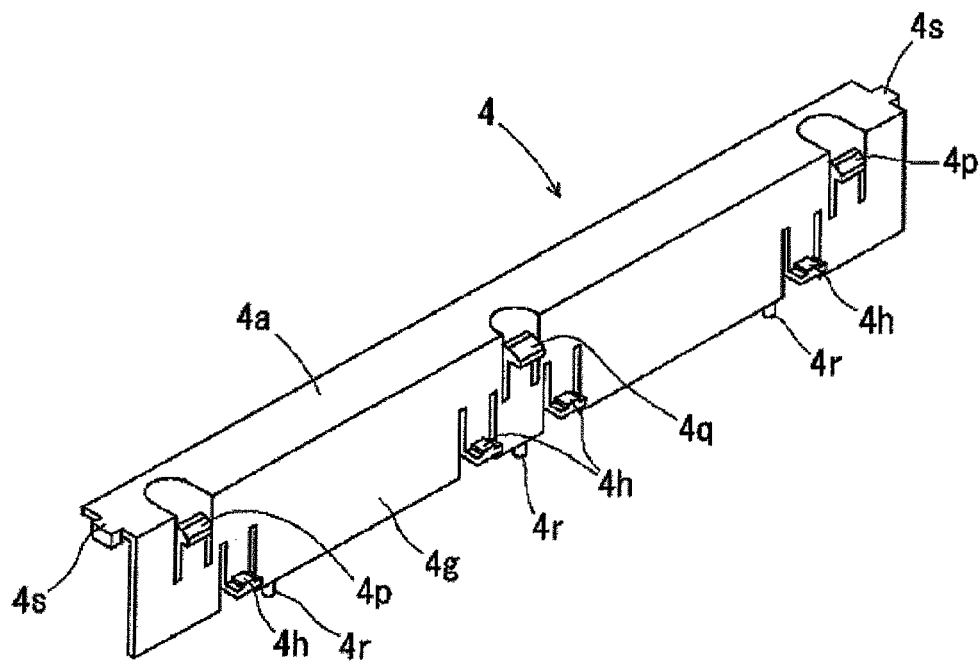
FIG. 4B is a perspective view showing an outer side of the lamp frame of the liquid crystal module illustrated in FIG. 1.
Figure 5:
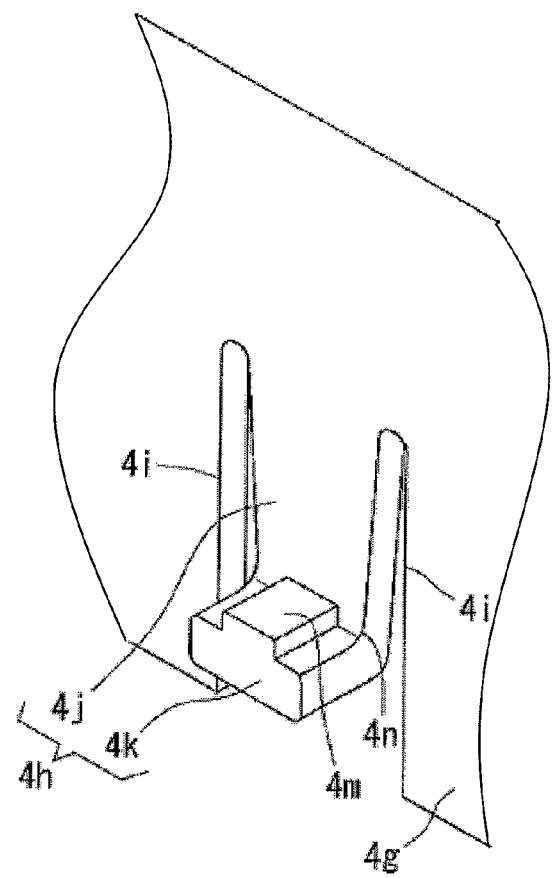
FIG. 5 is a detailed perspective view of a latching prong piece of the lamp frame illustrated in FIG. 4B.
Figure 12:
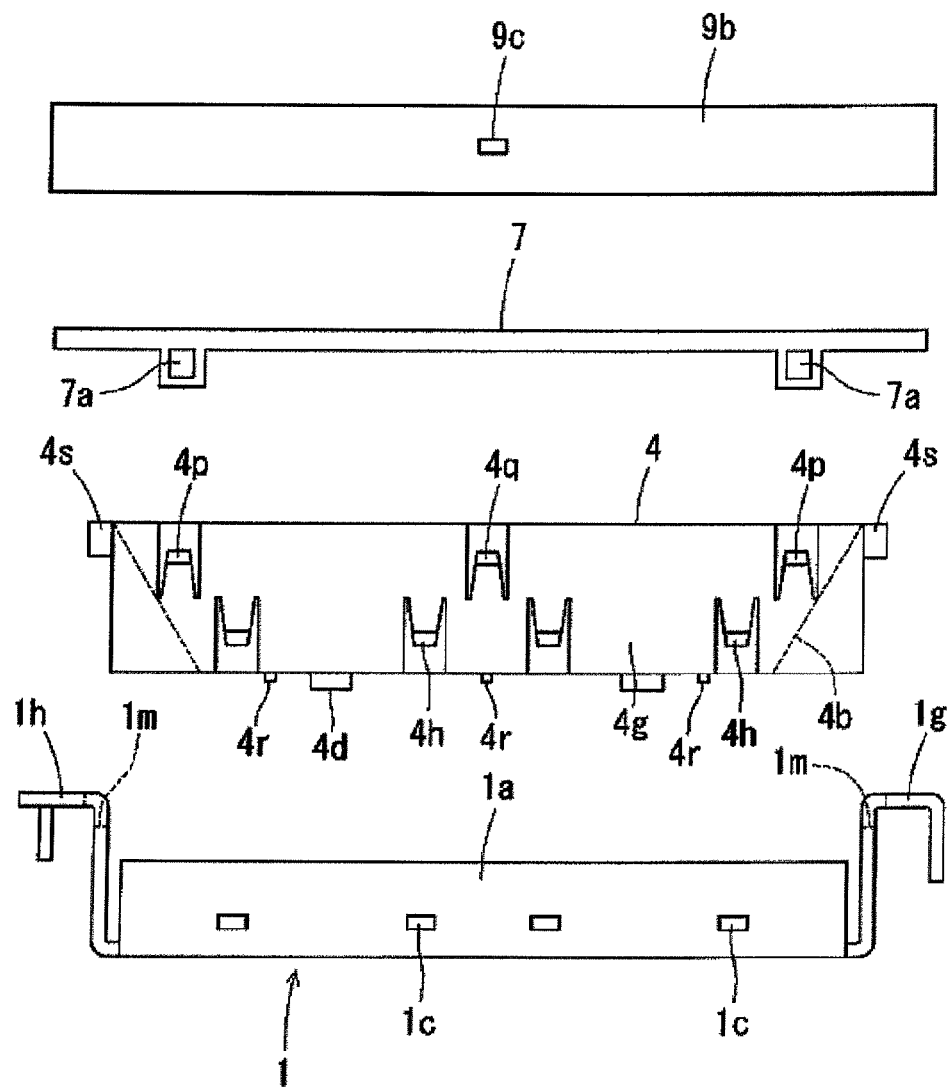
FIG. 12 is a simplified diagram illustrating an assembly of the liquid crystal module illustrated in FIG. 1.

As shown in FIGS. 4B and 12, four latching prong pieces 4h are formed at a lower part of the outer side plate 4g of the lamp frame 4. The latching prong pieces 4h fix the lamp frame 4. The latching prong pieces 4h are latched upward from an inside of the left and right side plates 1a and 1b into the engagement openings 1c formed in the left and right side plates 1a and 1b of the frame 1. As shown in FIG. 5, each of the latching prong pieces 4h has a spring piece 4j and a latching prong 4k. The spring piece 4j is formed by making a pair of cut-outs 4i from below in the outer side plate 4g of the lamp frame 4. The latching prong 4k protrudes from a lower end of the spring piece 4j. A rectangular bulge (e.g., bulge portion) 4m is formed on an upper face of the latching prong 4k so that an upper face of the bulge 4m is located higher than the upper face of the latching prong 4k. A curve (e.g., curve portion) 4n is provided to an inside corner between the spring pieces 4j and the latching prongs 4k.

Figure 8:
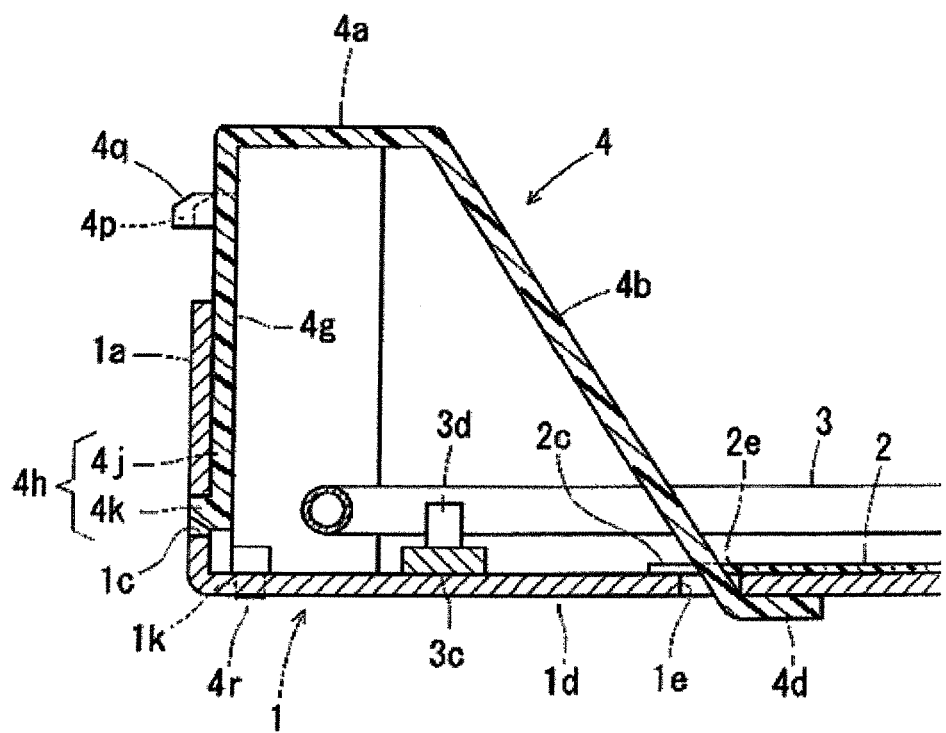
FIG. 8 is a partial cross sectional view of the liquid crystal module taken along A-B-C-D line of FIG. 3.

As shown in FIG. 8, the latching prong pieces 4h make use of the elasticity of the spring pieces 4j. Thus, the latching prongs 4k are allowed to be easily fitted into the engagement openings 1c and latched upward. Also, since a base portion of each of the latching prongs 4k is reinforced by respective one of the curve 4n, damage or destruction of the base portion of each of the latching prong 4k can be prevented. Furthermore, the upper face of each of the bulges 4m can be latched to respective one of the engagement opening 1c without being interrupted by the curves 4n.

Figure 7:
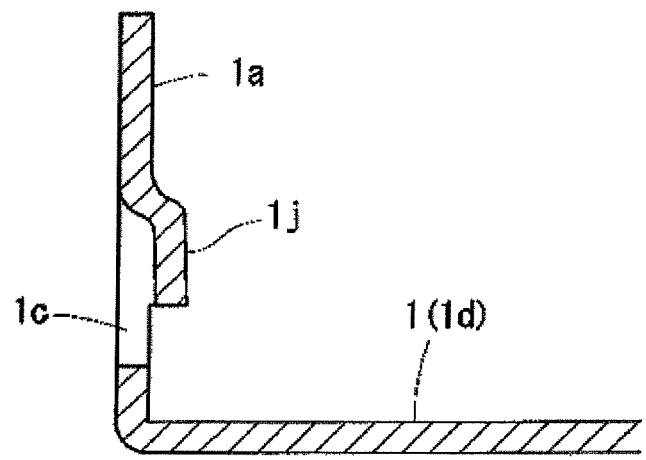
FIG. 7 is a partial cross sectional view of the liquid crystal module illustrated in FIG. 1.

As shown in FIG. 7, the engagement openings 1c can be such that upper edge portions 1j of the engagement openings 1c are bent inward of the left and right side plates 1a and 1b. This bending allows the latching prongs 4k of the latching prong pieces 4h to latch more deeply to the upper edge portions 1j, all the way to the base portions of the latching prongs 4k. Thus, the latching prongs 4k are effectively prevented from coming out of the engagement openings 1c.

As shown in FIGS. 4A, 4B and 12, the side latching prong components 4p and the middle latching prong component 4q are formed at an upper part of the outer side plate 4g of the lamp frame 4. The side latching prong components 4p are used to fix the sheet retainer frames 7. Specifically, the side latching prong components 4p are fitted into engagement holes 7a of the sheet retainer frames 7 and latching downward. The middle latching prong component 4q is used to fix the bezel 9. Specifically, the middle latching prong component 4q is fitted into a middle engagement hole 9c formed on each of the short bezels 9b and latching downward. Each of the side and middle latching prong components 4p and 4q has a latching prong and a spring piece. The latching prong protrudes from an upper end of the spring piece formed by making a cut-out. The latching prong of the middle latching prong component 4q used to fix the bezel 9 protrudes farther than the latching prongs of the side latching prong components 4p used to fix the sheet retainer frame 7.

As shown in FIGS. 4A, 4B, 8 and 9, three positioning pins 4r are formed at a lower end on the inside of the outer side plate 4g of the lamp frame 4. The positioning pins 4r include a middle positioning pin 4r and a pair of side positioning pin 4r formed at two ends. The positioning pins 4r protrude downward. The positioning pins 4r are inserted into positioning holes 1k formed in the base plate 1d of the frame 1. The positioning hole 1k into which the middle positioning pin 4r is inserted is a burred circular hole. On the other hand, the positioning holes 1k into which the side positioning pins 4r are inserted is an elliptical hole that accommodates thermal expansion and contraction, etc., of the lamp frame 4.

Figure 11:
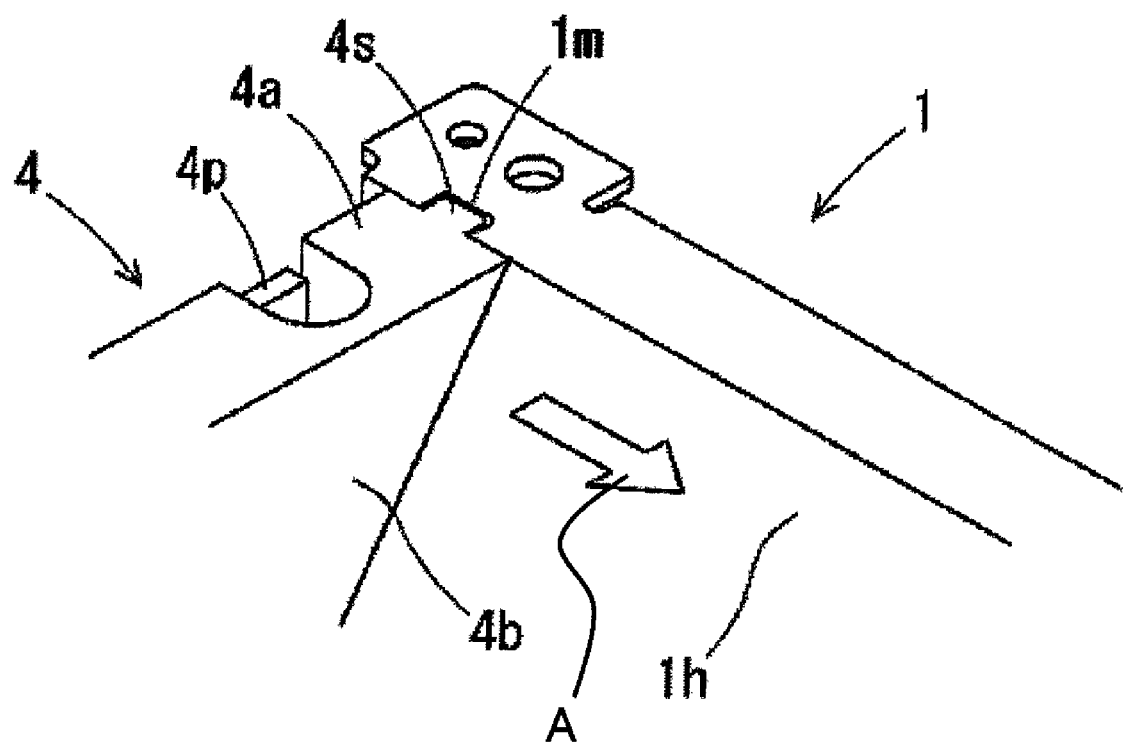
FIG. 11 is a partial perspective view illustrating a state when a convex component of the lamp frame is fitted into a concave component of the frame.

As shown in FIG. 4, the convex components 4s are provided protruding outward from both longitudinal ends of the front plate 4a of each of the lamp frames 4. As shown in FIGS. 3 and 11, when each of the lamp frame 4 is attached on the inside of each of the opposing left and right side plates 1a and 1b, each of the convex components 4s are fitted from above into respective one of the concave components 1m of each of the top and bottom side plates 1p and 1q. The convex component 4s and the concave component 1m are engaged and fixed in a falling direction indicated by the arrow A in FIG. 11. This prevents the lamp frames 4 from falling over or rattling.

Figure 9:
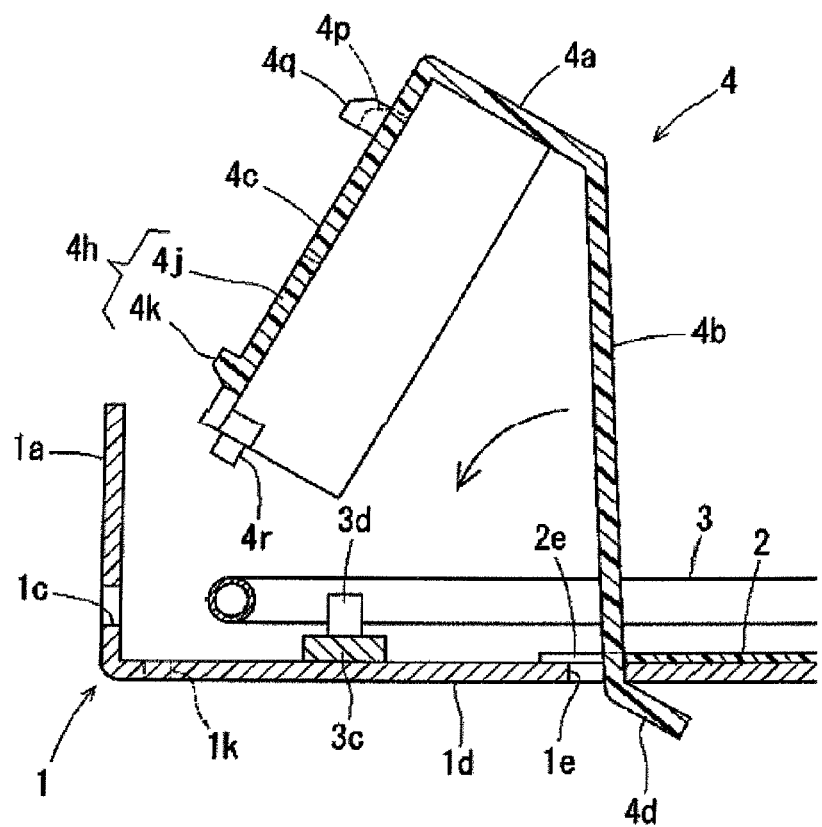
FIG. 9 is a partial cross sectional view illustrating a state when the lamp frame is tilted forward to insert the latching leg piece in an engagement hole of the frame.

The lamp frames 4 are simply attached and fixed in the following manner. Specifically, as shown in FIG. 9, the lamp frame 4 is tilted forward and the latching leg pieces 4d are inserted through the recesses 2e in the light reflecting sheet 2 and into the engagement holes 1e in the base plate 1d from above. The latching leg pieces 4d are hooked to the edges of the engagement holes 1e to form a fulcrum. Then, the lamp frame 4 is rotated to the rear around the fulcrum as indicated by the arrow. The elasticity of the spring pieces 4j of the latching prong pieces 4h is utilized to fit the latching prongs 4k into the engagement openings 1c of the left and right side plates 1a and 1b and latch the engagement openings 1c upward, and to latch the latching leg pieces 4d to the edges of the engagement holes 1e of the base plate 1d. At the same time, the convex components 4s protruding from both longitudinal ends of the front plate 4a of each of the lamp frames 4 into the concave components 1m of each of the top and bottom side plates 1p and 1q of the frame 1. As a result, attaching and fixing the lamp frame 4 is completed.

Each of the lamp frames 4 is attached and fixed on the inside of each of the left and right side plates 1a and 1b in a simple manner, without the use of screws. Furthermore, in the attached and fixed state, upward movement of the lamp frame 4 is restricted by the latching leg pieces 4d and the latching prong pieces 4h, forward movement of the lamp frame 4 is restricted by the latching leg pieces 4d, rearward movement of the lamp frame 4 is restricted by the left and right side plates 1a and 1b of the frame 1, lengthwise movement of the lamp frame is restricted by the latching leg pieces 4d, the latching prong pieces 4h, and the edge frame parts 1h and 1g of the frame 1. Furthermore, rotation of the lamp frame 4 in the falling direction of the front plate 4a is also restricted by the convex components 4s at both longitudinal ends of the front plate that are fitted into the concave components 1m. Thus, the lamp frame 4 is held securely with substantially no rattling or falling.

When the lamp frames 4 are attached and fixed as above, the left and right end edge portions 2c and 2d of the light reflecting sheet 2 are held down by the lower ends of the inner side plates 4b of the lamp frames 4. Thus, movement of the left and right end edge portions 2c and 2d of the light reflecting sheet 2 is restricted by the latching leg pieces 4d of the lamp frames 4 inserted in the recesses 2e of the light reflecting sheet 2. Therefore, the light reflecting sheet 2 is fixed in a state of being accurately positioned.

As shown in FIG. 2, four peripheral edges of the light diffusing sheet 5 and the prism sheet 6 that is superposed thereover are placed over the front plates 4a of the lamp frames 4 and the end edge parts 2a and 2b of the light reflecting sheet 2 superposed over the edge frame parts 1h and 1g of the frame 1. The light diffusing sheet 5 and the prism sheet 6 are held down from above by the sheet retainer frames 7. The sheet retainer frames 7 are made of a synthetic resin and put together in a rectangular frame shape. As shown in FIGS. 1 and 12, engagement holes 7a are formed on short frame parts of the retainer frames 7. The engagement holes 7a engage with the latching prong components 4p of the lamp frames 4. Specifically, the latching prong components 4p of the lamp frames 4 are latched downward to the engagement holes 7a, thereby attaching the sheet retainer frames 7. Furthermore, the sheet retainer frames 7 are positioned by inserting positioning pins (not shown) formed in corner portions of the sheet retainer frames 7 into positioning holes formed in corner portions of the frame 1.

The peripheral edges of the liquid crystal panel 8 are placed over the sheet retainer frames 7. The liquid crystal panel 8 is fixed from above with the bezel 9, thereby completing the assembly of the liquid crystal module. The long and short bezels 9a and 9b are put together in the form of a rectangular frame and fixed at the corners with screws to the frame 1. A middle part of the short bezels 9b can be prevented from lifting up and creating a gap by latching the middle latching prong components 4q of the lamp frames 4 downward to the middle engagement hole 9c. The long bezels 9a are attached without any gap by fixing the long bezels 9a in the middle with screws to the frame 1.

With the liquid crystal module, the latching leg pieces 4d of the lamp frames 4 is inserted and latched to the engagement holes 1e of the base plate 1d. Furthermore, the latching prongs pieces 4h of the lamp frames 4 is latched upward to the engagement openings 1c of the left and right side plates 1a and 1b. Moreover, the convex components 4s of the front plate 4a of the lamp frames 4 are fitted into the concave components 1m of the top and bottom side plates 1p and 1q of the frame 1, and engaged in the falling direction. Thus, even though the lamp frames 4 are attached without the use of any screws, the lamp frames 4 can be satisfactorily prevented from rattling or falling over. Therefore, there is no misalignment or other adverse effects to the bezel 9 or other members that mate with the lamp frames 4. Furthermore, this solves such problems as light leakage and misalignment of the blacked-out region around the liquid crystal panel.

Various means can be employed as the anti-falling means. With the liquid crystal module, both longitudinal ends of each of the lamp frames 4 are fixed in the falling direction to the top and bottom side plates 1p and 1q. Thus, the lamp frames 4 can be prevented reliably from falling over. In particular, with the liquid crystal module, the anti-falling means includes the convex components 4s and the concave components 1m. The convex components 4s are fitted into the concave components 1m and engaged in the falling direction of the lamp frames 4. Thus, the structure can be simple and the anti-falling effect and anti-rattling effect can be enhanced. Also, the convex components 4s protrude from both longitudinal ends of the front plate 4a of the lamp frames 4, and the concave components 1m are correspondingly formed at the upper ends of the top and bottom side plates 1p and 1q of the frame 1. Thus, the load imparted to the convex components 4s or the concave components 1m in impeding the fall of the lamp frames can be substantially kept to a minimum. As a result, there will be no worry about the convex components 4s or the concave components 1m being damaged. Furthermore, the falling and rattling of the lamp frames 4 can be prevented even more reliably.

Also, with the liquid crystal module, the lamp frames 4 have the front plate 4a, the inner side plate 4b and the outer side plate 4g. The latching leg piece 4d is correspondingly latched to the latching hole 1e formed in the base plate 1d of the frame 1. The latching prong piece 4h is correspondingly latched upward to the engagement opening 1c of the frame 1. Thus, the lamp frames will be less prone to rattling or falling from the outset. Furthermore, since the convex components 4s are provided to the front plates 4a of the lamp frames 4 and fitted from above into the concave components 1m at the upper ends of the top and bottom side plates 1p and 1q of the frame 1. Thus, the effect of preventing rattling and falling can be quite pronounced.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal module comprising:
a frame including top, bottom, left and right side plates, and a base plate disposed on a lower side of the top, bottom, left and right side plates,
a light reflecting sheet provided on the base plate of the frame;
a cold cathode tube disposed above the light reflecting sheet;
an optical sheet disposed above the cold cathode tube;
a liquid crystal panel disposed above the optical sheet;
a bezel disposed on a peripheral edge of the liquid crystal panel to hold down the liquid crystal panel;
a pair of lamp frames fixedly attached along the left and right side plates of the frame in an interior of the frame; and
a restriction component provided between each of the lamp frames and each of the top and bottom side plates to prevent the lamp frames from rotating around a longitudinal axis of the lamp frames with respect to the frame, the restriction component including convex components formed at both longitudinal end portions of each of the lamp frames, and concave components formed on each of the top and bottom side plates of the frame, the convex components being fitted into the concave components such that the lamp frames are prevented from moving inward of the frame relative to the left and right side plates of the frame, respectively.

2. The liquid crystal module according to claim 1, wherein the lamp frames are attached to the frame without the use of screws.

3. The liquid crystal module according to claim 1, wherein the restriction component fixes both longitudinal ends of each of the lamp frames to the top and bottom side plates of the frame.

4. The liquid crystal module according to claim 1, wherein each of the convex components protrudes from a front plate of each of the lamp frames, and
each of the concave components is correspondingly formed at an upper end portion of each of the top and bottom side plates of the frame.

5. The liquid crystal module according to claim 4, wherein each of the lamp frames further has
an inner side plate extending rearward from an inner edge portion of the front plate, the inner side plate including a latching leg piece that is formed at a lower end of the inner side plate and latches a latching hole formed on the base plate of the frame, and
an outer side plate extending rearward from an outer edge portion of the front plate, the outer side plate including a latching prong piece that latches frontward to an engagement hole formed on each of the left and right side plates.

6. The liquid crystal module according to claim 3, wherein each of the convex components protrudes from a front plate of each of the lamp frames, and
each of the concave components is correspondingly formed at an upper end portion of each of the top and bottom side plates of the frame.

7. The liquid crystal module according to claim 6, wherein each of the lamp frames further has
an inner side plate extending rearward from an inner edge portion of the front plate, the inner side plate including a latching leg piece that is formed at a lower end of the inner side plate and latches a latching hole formed on the base plate of the frame, and
an outer side plate extending rearward from an outer edge portion of the front plate, the outer side plate including a latching prong piece that latches frontward to an engagement hole formed on each of the left and right side plates.

* * * * *